W. GROSSHANS.
CORN HARVESTER.
APPLICATION FILED JUNE 24, 1918.

1,316,712.

Patented Sept. 23, 1919.
5 SHEETS—SHEET 1.

Inventor
W. GROSSHANS.

Attorneys

W. GROSSHANS.
CORN HARVESTER.
APPLICATION FILED JUNE 24, 1918.

1,316,712.

Patented Sept. 23, 1919.
5 SHEETS—SHEET 4.

Fig. 4

Inventor
W. Grosshans,
By [signature], Attorney.

W. GROSSHANS.
CORN HARVESTER.
APPLICATION FILED JUNE 24, 1918.

1,316,712.

Patented Sept. 23, 1919.
5 SHEETS—SHEET 5.

Inventor
W. GROSSHANS

By
Lacey & Lacey, Attorneys

UNITED STATES PATENT OFFICE.

WILLIAM GROSSHANS, OF ROWENA, TEXAS.

CORN-HARVESTER.

1,316,712.

Specification of Letters Patent.

Patented Sept. 23, 1919.

Application filed June 24, 1918. Serial No. 241,574.

*To all whom it may concern:*

Be it known that I, WILLIAM GROSSHANS, a citizen of the United States, residing at Rowena, in the county of Runnels and State of Texas, have invented certain new and useful Improvements in Corn-Harvesters, of which the following is a specification.

This invention relates to grain harvesting machines, more particularly to the class of "headers" whereby the valuable or ear portions of grain are severed from the stalks and deposited in a receptacle carried by the apparatus. The improved apparatus is designed more particularly for harvesting the valuable portions of certain kinds of grain, more especially of Kafir corn and like products, and has for one of its objects to provide an apparatus whereby the heads or valuable portions of the grain are first severed below the growth of the ears and the severed portions supported in position until again acted upon by a supplemental severing apparatus to divide the severed portions and deposit the divided portions in a receptacle, the machine passing over the stalks from which the heads have been severed and leaving them in the ground. The grain is thus divided into relatively small portions to facilitate the subsequent handling and feeding to stock and also to prepare the product for depositing in silos and the like.

Another object of the invention is to provide an apparatus of this character in which the severing devices are adjustable vertically to adapt the apparatus to growth of various sizes.

With these and other objects in view, the invention consists in certain novel features of construction, as hereinafter shown and described and then specifically pointed out in the claims; and in the drawings illustrative of the preferred embodiment of the invention—

The improved apparatus includes a main supporting frame preferably constructed from steam or like piping, and including side members 10—11 and a rear or transverse member 12 bent from a single piece, as shown. A draft tongue is connected to the side member 10 and comprises a rear portion 13 and a forward portion 15, the tongue portions being rigidly coupled by side straps 16 with the tongue sections united by a "scarf" joint illustrated at 17, so that the forward portion 15 of the tongue extends obliquely to the horizontal plane of the rear section 13. By this means the forward or yoke supporting portion of the tongue is elevated to the required extent. The main axle is represented at 18 and is rigidly connected to the side members 10—11 by U-bolts or like clip devices indicated at 19—20. Attached to one side face of the tongue section 13 is a relatively heavy strap 21, extending rearwardly and "clipped" at 22 to the axle 18. The axle is of the bowed form as illustrated at 23. Mounted for rotation upon the axle and relatively near the side member 10 is a main drive or "bull" wheel 24 having the usual ground engaging lugs 25, and likewise mounted for rotation upon the axle relatively near the frame member 11 is a bearing wheel 26. By this means a rigid supporting frame is produced having a draft tongue attached and which may be drawn over the ground by the team or teams connected to the tongue.

Depending from the portion 13 or the strap 21 is a bracket device 27, and connected to the rear frame member 12 is a forwardly directed bar 28. At its forward end the bar 28 is connected to the tongue portion 13 by a transverse bracket 29, and depending from the latter is a hanger 30 corresponding to the hanger 27, the hangers 27—30 being provided with bearings at their lower ends to support a counter shaft 31. Radius bars 32—33 are mounted to swing upon the axle 18 at opposite sides of the drive wheel 24, and are coupled at the other ends to the counter shaft 31. Connected to the inner side of the drive wheel 24 is a chain wheel 34, while a similar chain wheel 35 is rigidly coupled to the counter shaft 31, an endless chain 36 operating over the chain wheels. By this means the motion of the traction wheel 18 is transmitted to the shaft 31 as the machine is moved over the ground and the counter shaft rigidly supported in position relatively to the axle. The chain wheel 34 will be provided with a suitable backing ratchet not shown, so that the chain and the counter shaft will not be actuated when the machine moves rearwardly in the usual manner.

Figure 2:
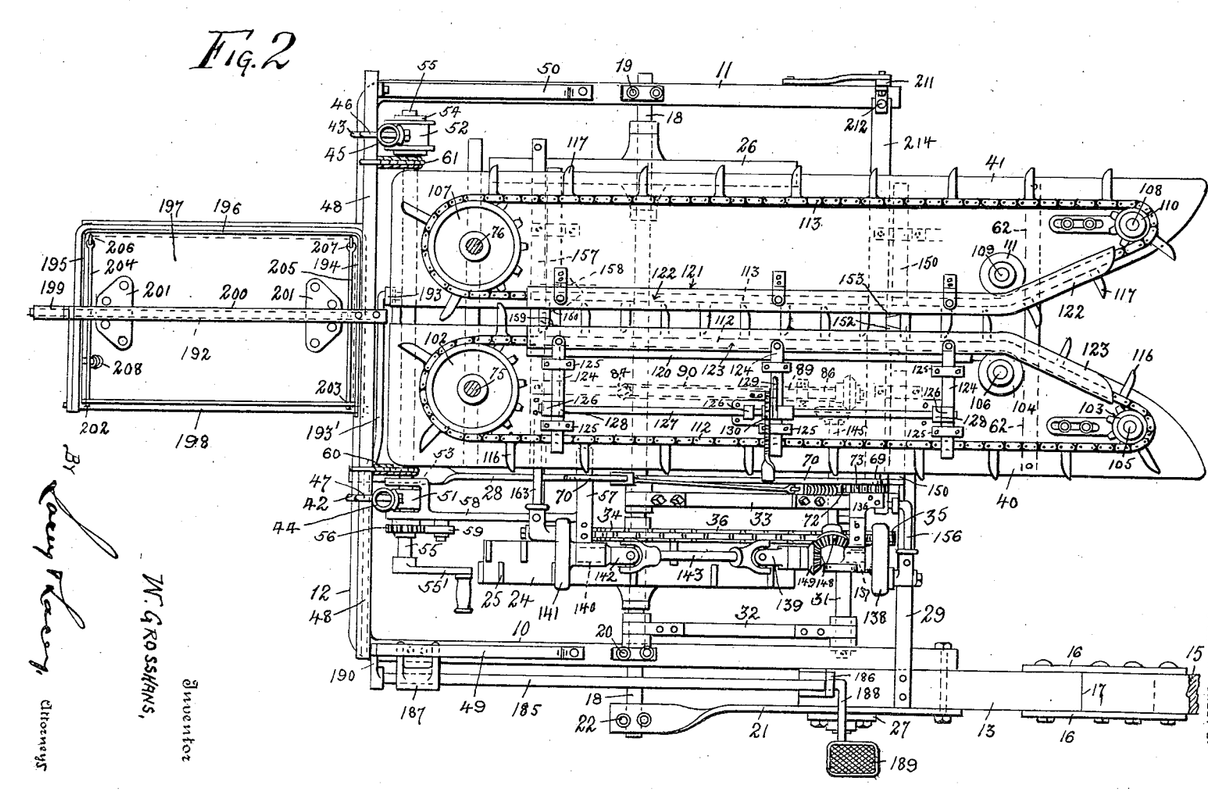
Fig. 2 is a plan view with certain portions removed.
Figures 5, 6, 7, 8:
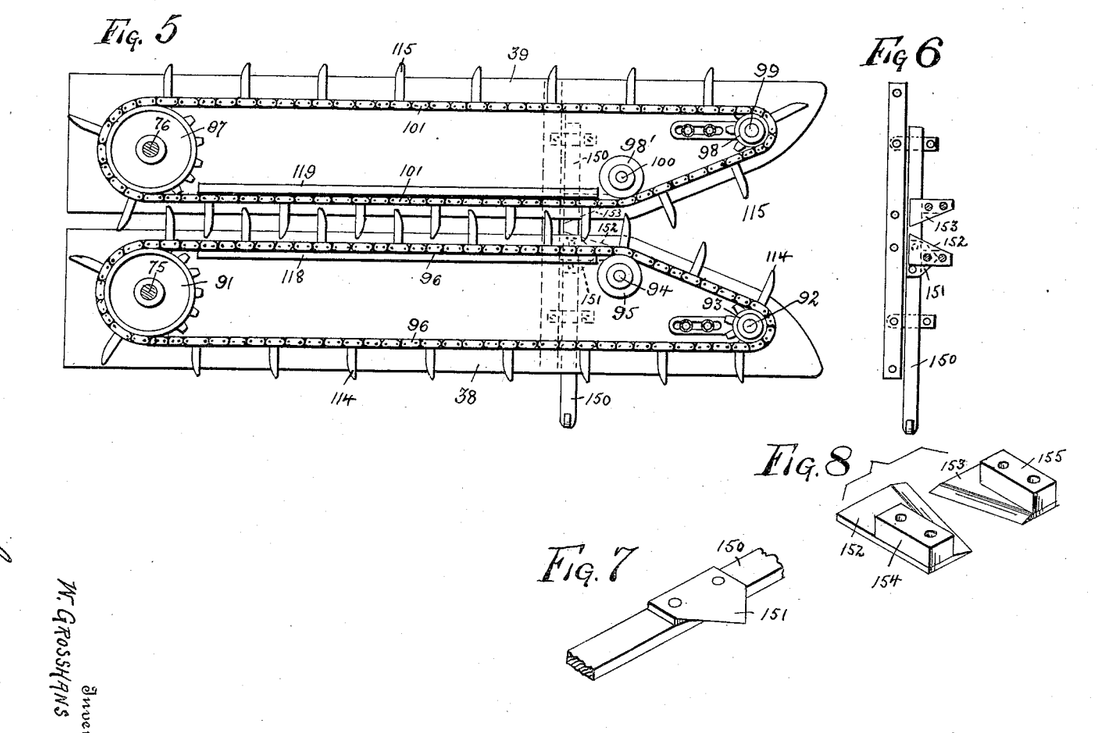
Fig. 5 is a plan view of the lower supporting member and its carrier chains.
Fig. 6 is a detached detail of one of the sickle devices.
Fig. 7 is an enlarged perspective view of a portion of one of the sickle bars with its sickle knife attached.
Figs. 8 are enlarged detached perspective views of one pair of the ledger plates associated with the sickle knives.

Located above the line of the frame members 10—11 are carrier chain supporting devices including lower platforms or supporting members 38—39 and upper platforms or supporting members 40—41. The members 38—39 and 40—41 are spaced slightly apart at their confronting edges and extend in parallel relation for the major portions of their length and diverge at their forward ends as shown in Figs. 2 and 5.

Connected by suitable clip devices 42—43 to the rear members 12 are standards 44—45, preferably of sections of steam piping, and connected by clip devices 46—47 at their upper ends to a transverse member 48. The member 48 is further supported from the side member 10 of the frame by an oblique brace 49, while a similar oblique brace 50 supports the member 48 from the side member 11. By this means the standards 44—45 are firmly supported in vertical position relative to the supporting frame of the machine.

Connected at its ends to the standard 44 is a guide strap 51, while a similar guide strap 52 is connected at its ends to the standard 45. Slidably disposed between the standard 44 and the guide strap 51 is a sleeve 53, while a similar sleeve 54 is slidably disposed between the guide strap 52 and the standard 45. A shaft 55 is mounted for rotation through the sleeves 53—54 and is extended at one end to receive an operating crank 55′, the shaft also carrying a ratchet wheel 56. Connected to the upper supporting member 40 is a supporting bracket 57 which is extended rearwardly as shown at 58 and merges into the sleeve 53. Connected to the portion 58 of the bracket is a pawl 59 which engages the ratchet 56 and prevents retrograde movement of the shaft 55. Connected at their upper ends to the transverse coupling member 48 are chains 60—61, which have their lower ends attached to the shaft 55 to wind thereon. By this arrangement it will be obvious that when the shaft 55 is rotated by means of the crank 55′ to wind the chains thereon the shaft together with its sleeves will move vertically of the standards, the sleeves being retained in position by the guide straps 51—52, and the shaft 55 retained in its adjusted position by the coaction of the ratchet 56 and the pawl 59.

The supporting members 38 and 40 and 39 and 41 are rigidly coupled by a plurality of bracket devices 62 spaced at suitable intervals. Connected to the lower faces of the rear portions of the supporting members 38—39 is a bracket device 63 having depending terminals 64 through which the shaft 55 is free to rotate. By this arrangement the chain supporting members are coupled to the shaft 55 and are adjusted vertically therewith when the latter is actuated as before described by the operation of the crank 55′ and the chains 60—61.

Depending from the lower faces of the supporting member 38 near its forward end is a bracket device including spaced members 65—66. Mounted for rotation between the members 65—66 are anti-friction rollers 67—68.

Pivoted at 69 upon the bracket member 29 is a lever 70 extended at one end into a handle 71 and provided with a pawl device 72 coacting with a toothed segment 73 to hold the lever in adjusted position. At one end the lever 70 is extended as shown at 74 through the space between the bracket members 65—66 and likewise between the anti-friction rollers 67—68. The forward ends of the supporting members 38, 39, 40 and 41 are thus rendered adjustable vertically by actuating the lever 70, the supporting member being held in adjusted position through the coaction of the pawl 72 and the toothed segment 73.

Figure 3:
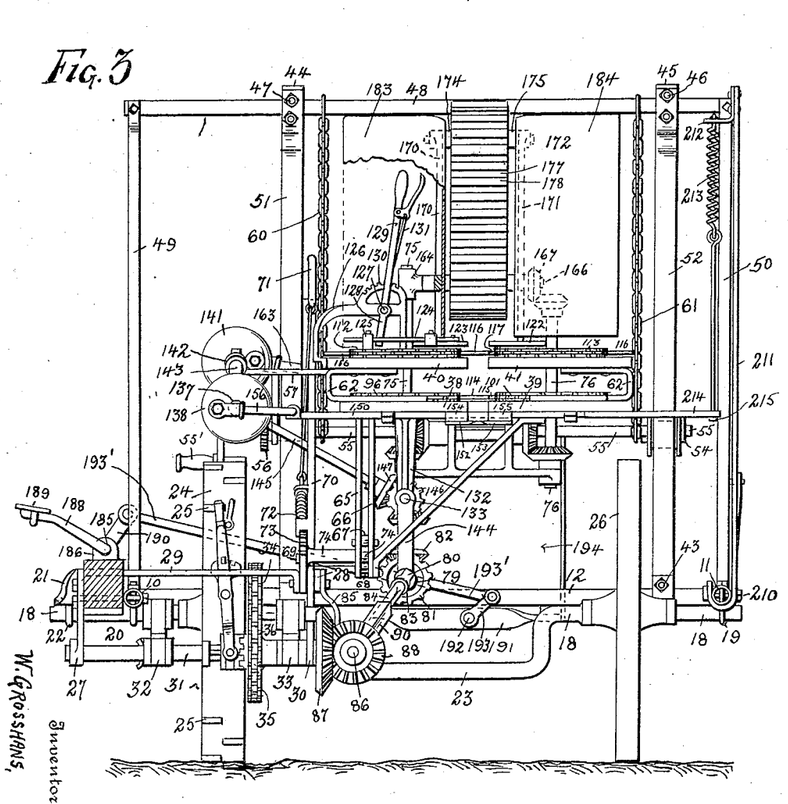
Fig. 3 is a front elevation.
Figure 4:
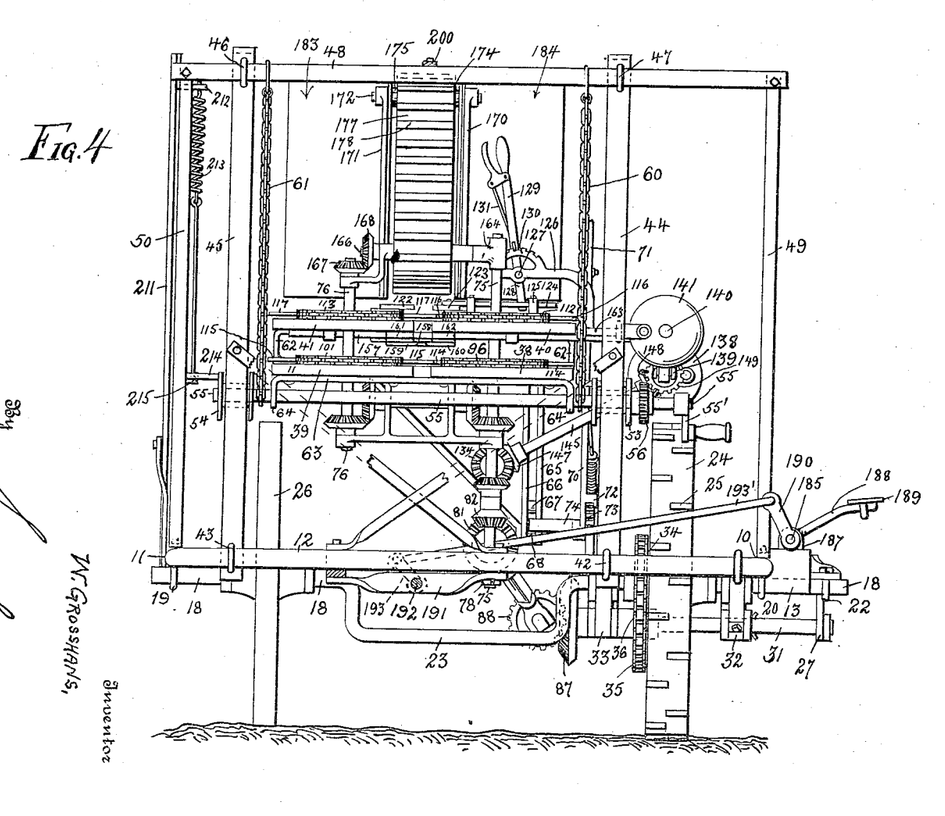
Fig. 4 is a rear elevation without the receptacle.

Extending through the supporting members 38 and 40 is a vertical shaft 75, while a similar vertical shaft 76 extends through the supporting members 39—41. Depending from the supporting member 38 is a hanger device represented as a whole at 77 having a bearing 78 at its lower end to carry the lower end of the shaft 75. The bracket device 77 is also provided with a horizontal bearing indicated at 79 and carrying a stub shaft 80, the latter having a gear wheel 81 engaging a gear pinion 82 on the shaft 75. The stub shaft 80 is provided with a universal coupling indicated at 83 from which a square or otherwise than round shaft 84 extends. Extending from the coupling bar 28 is another bracket device represented at 85, and having a bearing at its lower end to carry another stub shaft 86. Mounted upon the counter shaft 31 is a gear wheel 87 engaging with another gear wheel 88 on the stub shaft 86. Connected to the stub shaft 86 is a universal coupling 89 having a tubular shaft 90 with its interior square or otherwise than round to receive the otherwise than round shaft 84. The stub shaft 80 it will be noted by reference to Fig. 3, is not in vertical alinement with the stub shaft 86, hence the necessity for the universal couplings 83 and 89 and the slip joint device embodied in the shafts 84 and 90. By this means the motion of the counter shaft 31 will be communicated to the vertical shaft 75, and provision made through the coaction of the universal couplings and the slip joint device formed by the members 84—90, whereby the vertical adjustment of the chain supporting devices will not cramp the operating devices associated with the shaft 75.

Mounted upon the shaft 75 above the upper face of the lower supporting member 38 is a chain pulley 91, and mounted for rotation upon a stub shaft 92 near the forward end of said member 38 is a chain pulley 93, and mounted for rotation upon a stub shaft 94 upon said member 38 is a guide pulley 95. The chain pulley 93 operates relatively near the forward end of the member 38 while the guide pulley 95 is located near the inner edge of the member 38 and rearwardly of the pulley 93. The pulleys 93—95 are spaced at substantially uniform distances from the obliquely directed edge of the member 38 as shown in Fig. 5. An endless chain 96 operates over the pulleys 91, 93 and 95 as shown. Mounted upon the shaft 76 above the upper face of the lower supporting member 39 is another chain pulley 97, while a smaller chain pulley 98 and guide pulley 98′ are mounted for rotation respectively upon stub shafts 99—100 at the forward ends of the member 39. An endless chain 101 engages around the pulley 97—98 and 98′. The pulleys 98 and 98′ are arranged substantially in the same manner as the pulleys 93—95 except that they are in reversed position, and contiguous to the obliquely directed edge of the forward portion of the member 39. The upper supporting members 40—41 are of greater length than the lower supporting members 38—39 and overhang the same at their forward ends with their confronting edges diverging in the same manner and as before described relative to the members 38—39, and as shown in Fig. 2. The shaft 75 is provided with a chain pulley 102 above the upper supporting member 40, while a chain pulley 103 and guide pulley 104 are mounted respectively upon stub shafts 105 and 106 carried by the said member. The shaft 76 is provided with a chain pulley 107 above the upper face of the supporting member 41, and mounted upon stub shafts 108 and 109 carried by said member at its forward end is a chain pulley 110 and guide pulley 111. The pulleys 103 and 104 and 110 and 111 are arranged in substantially the same manner as the similar pulleys upon the supporting members 38 and 39. An endless chain 112 extends around the pulleys 102, 103 and 104, while an endless chain 113 extends around the pulleys 107, 110 and 111.

The chain 96 is provided with a plurality of carrying fingers 114 while the chain 101 is provided with a plurality of similar fingers 115. The chain 112 is provided with a plurality of carrier fingers 116 while the chain 113 is provided with a plurality of similar fingers 117. The carrier fingers of the chains at one side are preferably arranged to operate between the carrier fingers of the coacting chains at the other side, as illustrated in Figs. 2 and 5, and thus lap past each other as they travel between the supporting members. The chains are arranged to support the corn or other product between them as the machine is moved forwardly and convey it toward the rear of the machine, as hereafter more fully explained. The contiguous or rearwardly moving portions of the chains 96 and 101 are supported by backing members 118 and 119 attached respectively to the supporting members 38—39, while the chains 112 and 113 are similarly supported by backing members 120 and 121. By this means the rearwardly moving portions of the chains are supported and prevented from lateral displacement by the pressure of the severed portions of the corn as it is conveyed toward the rear. Connected to the upper face of the backing member 121 is a guard member 122 to prevent the severed material from coming in contact with the rearwardly moving portion of the chain 113. Movably disposed above the backing member 120 is a guard member 123, and connected to the latter are a plurality of guide bars 124 arranged to operate through supports 125, the latter connected to the upper face of the member 40 between the side portions of the chain 112. Rising from the support 40 are standards 126, and mounted for rotation through the standards is a longitudinally directed rock shaft 127. Attached to the rock shaft above each of the bars 124 is an arm 128 extending respectively through apertures or seats in the bars 124. Connected to the shaft 127 is an operating lever 129 movable over a suitable toothed segment 130, the lever carrying a stop pawl indicated at 131, to hold the lever in adjusted position. By this arrangement it will be obvious that when the lever 129 is actuated the guard member 123 will be correspondingly operated and moved toward or away from the center of the machine to decrease or increase the distance between the members 122 and 123. By this means the width of the space between the rearwardly moving portions of the chains may be adjusted to any required extent, and the member 123 held in adjusted position. The levers 70 and 129 are disposed in convenient position for the operator upon the seat of the device, the latter not being shown as it forms no part of the present invention, and its presence would obscure certain parts of the apparatus.

Depending from the lower supporting member 38 is a hanger device 132 having a bearing at its lower end to carry the forward portion of a shaft 133, while the rear end of the shaft is mounted in a bearing upon the bracket 77. Connected to the shaft 133 at its rear end is a bevel gear 134 engaging with a bevel gear 135 on the shaft 75. By this means the motion of the shaft 75 will be communicated to the shaft 133. Suitably supported by a bracket device 136 from the lower supporting member 38 is a shaft indicated at 137 with a crank wheel 138 at one end and a universal joint 139 at the other end. Mounted for rotation in the bracket device 57 is another counter shaft indicated at 140 carrying a crank wheel 141 at one end and a universal joint 142 at the other end. A shaft 143 is connected at its ends to the universal couplings 139 and 142, so that the motion of the shaft 137 is communicated to the shaft 140 and the crank wheels 138 and 141. A bracket device 144 is fitted upon the shaft 133 and supports one end of an obliquely directed shaft 145, the oposite end of the latter being supported in the bracket 136. The shaft 133 carries a bevel gear 146 engaging with a similar bevel gear 147 on the oblique shaft 145, while a bevel gear 148 on the shaft 145 engages with a bevel gear 149 upon the shaft 137. By this means the motion of the shaft 133 is communicated to the shafts 145 and 137.

Near their forward ends the supporting members 38—39 are provided with a suitable sickle or severing mechanism arranged to be actuated from the crank wheel 138, while the upper supporting members 40—41 are provided with a similar sickle or severing device adapted to be operated from the crank wheel 141. Mounted for movement transversely beneath the members 38—39 is a sickle bar 150 carrying a sickle knife 151. Attached to the lower face of the members 38—39 are ledger plates 152—153 with which the sickle knife 151 coacts as the sickle bar 150 is moved back and forth. The ledger plate 152 is maintained in spaced position relative to the member 38 by a spacer block 154, while a similar spacer block 155 maintains the ledger plate 153 in spaced relation to the member 38. The sickle bar 150 is connected to the crank pin wheel 138 by a connecting rod 156, so that when the wheel is rotated the sickle knife 151 will be moved transversely of the space between the members 38—39 and coact with the ledger plates 152 and 153. By this means as the machine is moved forwardly the heads of the corn or other material will be gathered between the converging forward portions of the supporting members and rapidly severed, and the severed portions engaged by the fingers of the chains and carried to the rear, and maintained by the coaction of the chains and fingers in vertical position, as hereafter explained.

A similar sickle bar 157 is supported for movement beneath the rear portions of the upper supporting members 40—41 and provided with a sickle knife 158. Ledger plates 159 and 160 are supported by spacer blocks 161 and 162 beneath the supporting members 40—41 in position to coact with a sickle knife 158 carried by the bar 157. The sickle bar 157 is coupled to the crank pin of the wheel 141 by a connecting rod 163, so that the rotation of the crank wheel 141 will be communicated to the sickle bar 157 and its knife 158. By this means the forward sickle device will sever stalks of corn just below the heads and the severed portions will be conveyed toward the rear by the coaction of the traveling chains and carrier fingers, and thus supported in a vertical position, and then the severed products will be again severed by the rear sickle mechanism.

Figure 1:
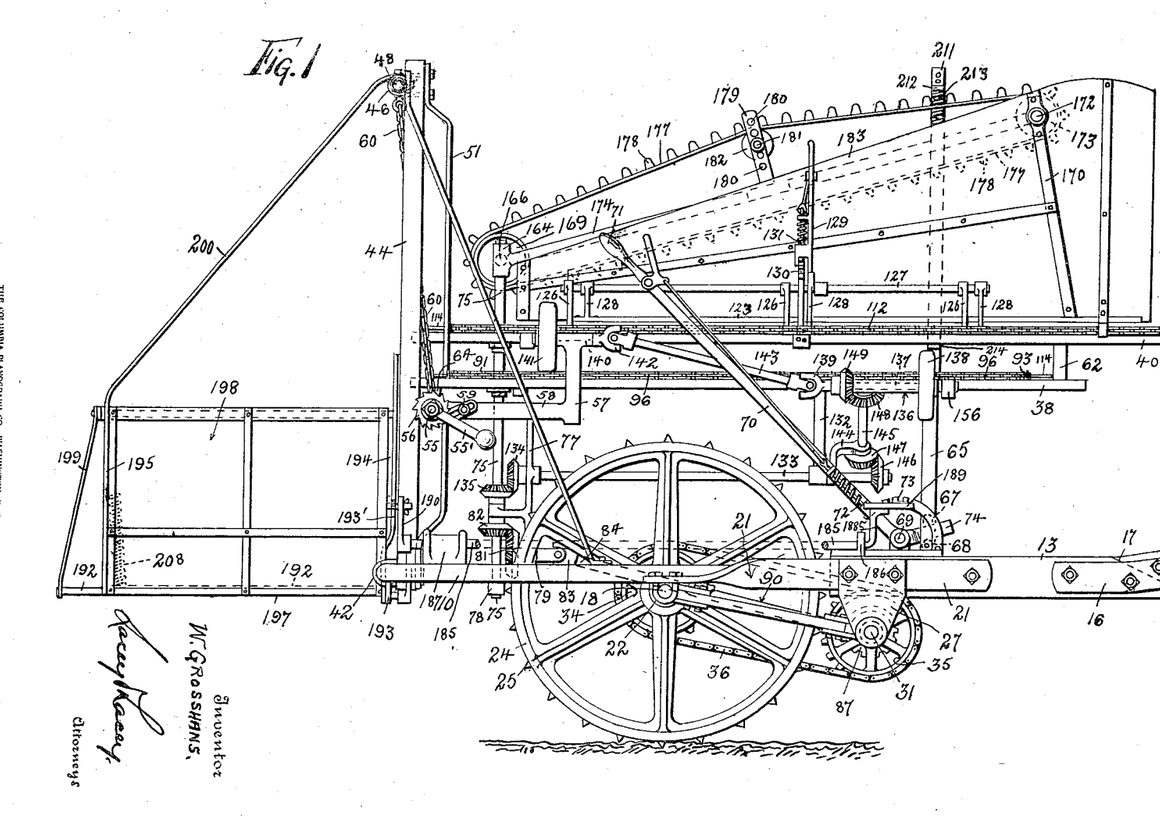
Figure 1 is a side elevation.

The shaft 75 is extended for a considerable distance above the upper supporting member 40 and operates through a sleeve 164, the latter having a lateral bearing in which a shaft 166 is mounted for rotation. The shaft 76 likewise extends above the member 41 and is provided with a bevel gear 167 engaging a similar bevel gear 168 on the shaft 166. By this means the motion of the shaft 76 is communicated to the shaft 166 and the latter supported at one end by the sleeve 164. Mounted upon the shaft 166 is a bolt carrying drum 169. Supported from the members 40—41 are standards indicated at 170 and 171, the upper ends of the standards supporting a transverse shaft indicated at 172. Mounted for rotation upon the shaft 172 is a belt carrying drum indicated at 173. The standards 170 and 171 are of sufficient length to maintain the drum 173 at a considerable distance above the upper faces of the members 40 and 41, and spaced rearwardly of the forward ends of the same as shown in Fig. 1. The sleeve 164 and the standard 170 are coupled by a supporting bar 174, while a similar supporting bar 175 extends between a supporting bracket and the standard 171. An endless belt 177 is supported on the drums 169 and 173, and is provided with transversely disposed slats 178 at spaced intervals. The belt it will be noted by reference to Fig. 1, extends in a rearwardly and downwardly inclined direction, so that as the belt is actuated by motion imparted to the drum 169 from the shaft 166 the slats 178 at the lower side travel toward the rear of the machine in a downwardly inclined direction, and thus operate upon the upper ends of the severed corn and depress any portions which may protrude abnormally and thus move the protruding ears or portions downwardly. By this means as the severed product approaches the rear sickle mechanism it is uniformly disposed, so that when finally divided the portions above and below the rear sickle mechanism will be substantially of uniform length. Rising from the members 174 and 175 is a standard device indicated at 179, said device having a plurality of apertures 180 to carry a shaft 181, the latter being provided with a drum or pulley 182 which operates as a tightener to the belt 177 and is adjustable vertically within the range of the apertures 180. By this means the tension of the belt 177 may be controlled. Sheet metal guide wings 183 and 184 are mounted upon the supporting members 40—41 with their forward portions curved outwardly or diverging toward the front to correspond to the diverging portions of the members 40—41, and with their rear portions extending in parallel and spaced relation above and substantially in alinement with the rearwardly moving portions of the chains. The members 183 and 184 thus serve as guides to the material as it is severed and carried to the rear.

Extending rearwardly from the rear transverse frame member 12 is a receptacle for the severed product, and this receptacle is arranged to be dumped at suitable intervals to discharge its contents. The dumping or discharging mechanism is arranged to be operated from the seat of the driver, preferably by the pressure of one of the driver's feet exerted upon a rock shaft 185 mounted in suitable standards 186 and 187 respectively upon the tongue member 13 and the frame member 10. At its forward end the shaft 185 is directed laterally as shown at 188 and terminates in a treadle member 189 convenient to the right foot of the driver or operator. At its rear end the shaft 185 is provided with a crank arm 190. Connected to the rear frame member 12 is a support 191 in which a rock shaft 192 is mounted. At its forward end the shaft 192 is provided with a crank arm 193 connected by a rod 193' to the crank arm 190. By this means the rock shaft 192 is operated by the pressure of the foot of the driver upon the treadle device 189.

The receptacle for the severed product comprises a stationary forward end 194, a stationary rear end 195, and one stationary side 196, a movable bottom 197, and a movable side 198. The shaft 192 is extended rearwardly of the supporting frame and is reinforced by a brace 199 from the rear end 195 of the receptacle. The receptacle is further supported and reinforced by an oblique brace 200 connecting the receptacle to the member 48. The bottom member of the receptacle is coupled to the shaft 192 by clip devices 201, so that the bottom of the receptacle is tilted when the shaft is oscillated. The movable side 198 of the receptacle is swingingly coupled at its upper edge to the ends 194 and 195 of the receptacle and swings outwardly at its lower edge. Connected at 202 and 203 to the movable side 198 are rods 204 and 205, the rods being coupled at their other ends to the bottom member 197 at 206 and 207. A spring 208 is connected to the bottom member 197 to automatically return the same to normal position when released. By this arrangement when the bottom member is tilted by oscillating the shaft 192 through the action of the treadle device 189, the rods will cause the movable side 198 of the receptacle to swing outwardly as the adjacent side of the bottom member 197 is moved downwardly, thus discharging the contents of the receptacle, and when the treadle member is released and the bottom 197 is returned to its horizontal position by the reaction of the spring 208, the movable side 198 will likewise be returned to its vertical position, and close the receptacle again ready for the next load.

Secured to the frame member 11 at 210 is a standard 211, and connected to the upper end of the standard at 212 is a spring 213.

The upper ends of the members 65—66 are secured at their upper ends to a transverse member 214 which is secured in turn to the lower supporting members 38—39 and rigidly couples the same. The member 214 is extended at one end to receive the lower end of the spring 212 at 215. The spring operates to yieldably support the members 38—39 and 40—41.

Having thus described the invention, what is claimed as new is:

1. In a machine of the class described, lower movable devices having coöperating gathering fingers, upper movable devices having coöperating gathering fingers, a severing device coacting with the lower movable devices and their gathering fingers and disposed rearwardly of the intake ends thereof, a severing device coacting with the upper movable devices and their gathering fingers and disposed in advance of the discharge ends thereof, an evener device operating above the upper movable devices and adapted to act upon protruding portions of the product as it is severed, and guide wings in spaced relation and coacting with the movable devices and their fingers.

2. In a machine of the class described, upper and lower supporting members in spaced relation, endless chain devices carried by said upper supporting member and provided with coacting gathering fingers, endless chain devices carried by said lower supporting member and provided with coacting gathering fingers, a severing device coacting with the lower chain devices and their gathering fingers and disposed rearwardly of the intake ends thereof, severing devices coacting with the upper chain devices and the gathering fingers and disposed in advance of the discharge ends thereof, means for actuating said endless chain devices, means for actuating said severing devices, supporting ribs bearing against the rearwardly moving sides of said chain, a guard member rigidly engaging the supporting rib of one of the upper chains, and a guard member movably engaging the supporting rib of the other of said upper chains.

3. In a machine of the class described, upper and lower supporting members in spaced relation, endless chain devices carried by said upper supporting member and provided with coacting gathering fingers, endless chain devices carried by said lower supporting member and provided with coacting gathering fingers, a severing device coacting with the lower chain devices and their gathering fingers and disposed rearwardly of the intake ends thereof, severing devices coacting with the upper chain devices and their gathering fingers and disposed in advance of the discharge ends thereof, means for actuating said endless chain devices, means for actuating said severing devices, supporting ribs bearing against the rearwardly moving sides of said chains, a guard member rigidly engaging the supporting rib of one of the upper chains, a guard member movably engaging the supporting rib of the other of said upper chains and means for adjusting said movable guard member.

4. In a machine of the class described, the combination of a supporting frame, cutters mounted on the frame, feeding devices operating longitudinally of the frame to move grain to and past the cutters, a receptacle at the rear end of the frame to receive cut grain from the feeding devices and having a swinging side and a tilting bottom, and means for simultaneously swinging said side and tilting said bottom.

5. In a machine of the class described, the combination of a supporting frame, cutters mounted on the frame, feeding devices operating longitudinally of the frame to move grain to and past the cutters, a receptacle at the rear end of the frame to receive cut grain from the feeding devices, said receptacle comprising stationary front and rear walls, a swinging side hung at its upper edge between said front and rear walls, a rock shaft journaled in said walls, a bottom secured to said rock shaft, a connection between said bottom and said swinging side, and means for actuating said rock shaft whereby to simultaneously tilt the bottom and swing the side.

6. In a machine of the class described, the combination of a pair of upper horizontally disposed platforms, a pair of lower horizontally disposed platforms, means for maintaining said platforms in fixed spaced relation, gathering fingers mounted on said platforms and projecting over the opposed edges thereof, means for actuating said fingers whereby to move grain rearwardly through the space between the inner opposed edges of the platforms, a cutter mounted on the lower platforms near the forward ends thereof, a cutter mounted on the upper platforms near the rear ends thereof, and means for reciprocating said cutters across the space between the platforms.

7. In a machine of the class described, the combination of a pair of upper platforms, a pair of lower platforms, means for maintaining the platforms in fixed spaced relation, gathering fingers mounted on said platforms and projecting over the opposed edges thereof, means for actuating said fingers whereby to move grain rearwardly through the space between the inner opposed edges of the platforms, cutters mounted on the platforms, means for operating the cutters, and an evener supported by and above the upper platforms and disposed longitudinally over the space between the inner opposed edges of the platforms.

8. In a machine of the class described, the combination of a pair of upper platforms, a pair of lower platforms, means for maintaining said platforms in fixed spaced relation, gathering fingers mounted on said platforms and projecting over the opposed edges thereof, means for actuating said fingers whereby to move grain rearwardly through the space between the inner opposed edges of the platforms, cutters mounted on the platforms, means for operating the cutters, vertically disposed wings supported on the upper platforms and disposed adjacent the inner edges thereof and over the gathering fingers mounted, respectively, thereon, and an evener supported by said platform and disposed longitudinally of the same between the wings.

9. In a machine of the class described, the combination of a pair of upper platforms, a pair of lower platforms, means for maintaining the platforms in fixed relation, gathering devices mounted on the platforms and having fingers projecting beyond the inner opposed edges of the same, means for actuating said gathering devices whereby to move the fingers rearwardly along the opposed edges of the platform, cutters mounted on the platforms, means for operating the cutters, means for adjusting the rear ends of the platforms vertically, and other means for adjusting the front ends of the platforms vertically.

10. In a machine of the class described, the combination of a pair of upper platforms, a pair of lower platforms, means for maintaining the platforms in fixed relation, gathering devices mounted on the platforms and having fingers projecting beyond the inner opposed edges of the same, means for actuating said gathering devices whereby to move the fingers rearwardly along the opposed edges of the platforms, cutters mounted on the platforms, means for operating the cutters, a yieldable support for the front ends of the platforms, means for adjusting the rear ends of the platforms vertically, and other means for adjusting the front ends of the platforms vertically.

In testimony whereof I affix my signature.

WILLIAM GROSSHANS. [L. S.]